(No Model.)
R. M. HUNTER.
ELECTRIC RAILWAY.
No. 381,556. Patented Apr. 24, 1888.
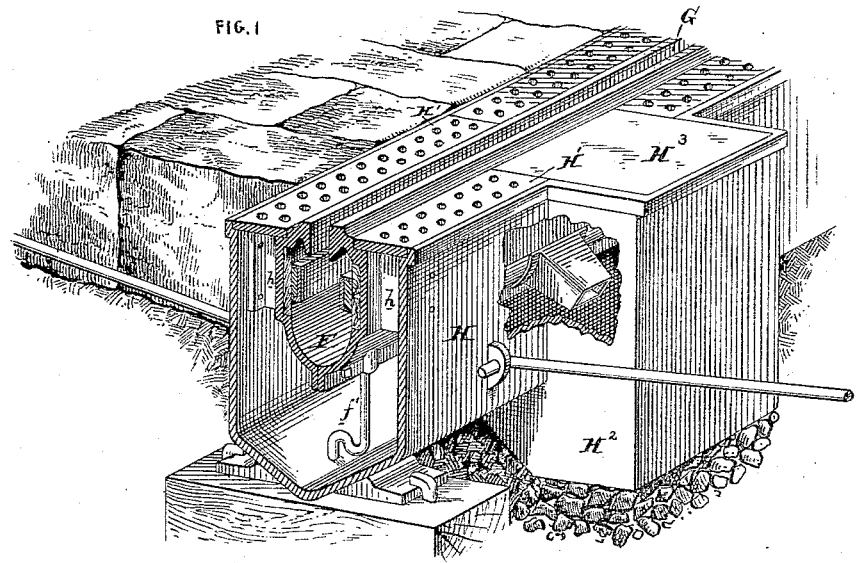
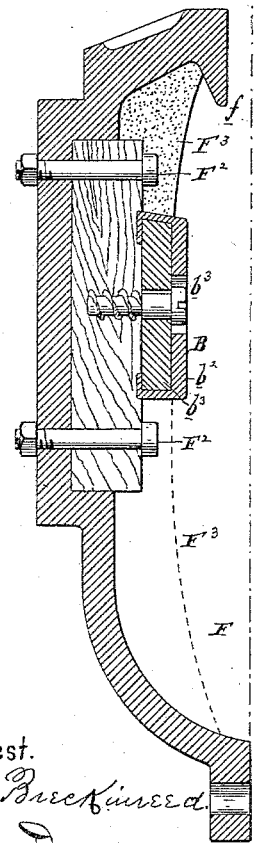
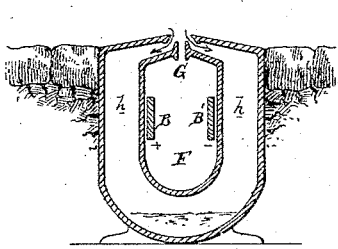
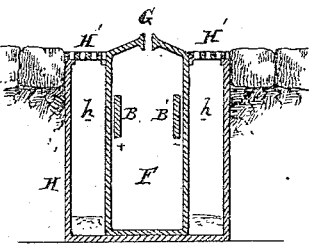
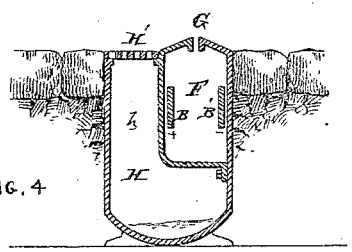
Attest.
E. M. Breckinred
Henry Drury
Inventor.

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 381,556, dated April 24, 1888.

Original application filed July 19, 1886, Serial No. 208,418. Divided and this application filed September 19, 1887. Serial No. 250,050. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to the construction and operation of electric railways; and it consists in certain improvements, fully set forth in the following specification, and shown in the accompanying drawings, which form part thereof.

In carrying out my invention I form a conduit with separate compartments for the working-conductors and water from the street, whereby the surface-water is carried off before reaching the slot. This insures the conductors remaining dry in wet weather and lessens the loss of current by leakage, and also allows of the slush-conduit being cleaned without interruption to the currents in the working-conductors. My object is also to construct the working-conductors in a manner suitable for the use to which they are put, whereby they are protected from electrical connection with the earth.

This application is a division of my application, Serial No. 208,418, filed July 19, 1886.

In the drawings, Figure 1 is a perspective view, with the front cut away, of my improved conduit for electric railways. Figs. 2, 3, and 4 are cross-sections of modified constructions of same; and Fig. 5 is a full-size cross section of one-half of the inner or conductor conduit.

The conduit herein set out in the various figures, 1 to 5, for containing the working-conductors consists of an inner conduit, F, which contains the conductors, and is made with the longitudinal slot G, and the outer or drainage conduit, H, adapted to carry off the surface drainage-water to prevent it reaching the slot G. The inner conduit, F, may be supported by the outer conduit, by brackets or otherwise, as shown, for instance, in Figs. 3 and 4, and provides vertical passage-ways $h$ opening from the interior into the street, and which are covered by perforated removable covers H'. The sides of the slot G are raised, so as to form a slight wall or embankment to prevent the water in heavy rains surging over the plates H' into the slot. By this means all of the drainage water and mud find their way into the outer conduit, from which they can be removed from time to time. The water may run into drainage-wells or catch-basins $H^2$, opening up to the street and having removable covers $H^3$. Small trap-pipes $f'$ may be used to cause the water which, from any cause, should pass into conduit F to find its way into conduits H. The object is to keep the conductors B B' as dry as possible to prevent formation of ice and escape of electricity.

The inner conduit may be made of two such parts, as shown in full size in Fig. 5, in which the conductor is shown of iron covered with copper face $b^2$, as set out in my application, Serial No. 195,741, filed March 18, 1886, said conductor being secured to the wooden stringer F' by screws $b^3$. The wooden stringer is preferably saturated with a water-proofing substance—such as paraffine—and is secured in a recess in the wall of the conduit by bolts $F^2$. When this is done, the space between the conductor and the top of the conduit-section may be filled with asphaltum or any cement or impervious and non-conducting substance, $F^3$, which covers the bolt-heads and exposed upper part of stringer. The lower edge of the slot G may project down, as at $f$, substantially as set out in my application filed June 9, 1886, to cause any water entering the slot to fall to the bottom without reaching the conductors. The lower part of the conduit-walls may be similarly covered with asphaltum or cement, as at $F^3$, dotted lines. These halves of the conduit may be made in the shop complete and then bolted together, and in case of necessity the inner conduit could at any time be removed for repairs.

In place of forming the conduit as shown in Fig. 1, it may be formed as indicated in Figs. 2, 3, and 4.

In the construction shown in Fig. 2 the slot of the outer conduit is arranged over the slot of the inner conduit, and is wider, so that the surface-water will run down upon the outside of the inner conduit. The construction shown in Fig. 4 is particularly adapted to the construction of road-bed set out in my application filed February 17, 1886, Serial No. 192,187, in which case the grate or cover H' would come next to the highest rail.

The mere mechanical details of construction of the conduit is immaterial, as my invention comprehends, broadly, the double form of conduit herein set out.

Any matter shown or described in this application and not claimed is not dedicated to the public, but forms subject-matter of other pending applications filed July 19, 1886, Serial No. 208,488; also, application filed July 14, 1885, Serial No. 171,625; also, application filed October 4, 1886, Serial No. 215,200.

Having now described my invention, what I claim as new, and desire to secure by Letters Patent, is—

1. The combination of an outer drainage-conduit with an inner slotted working-conduit, substantially as and for the purpose specified.

2. The combination of an outer drainage-conduit with an inner slotted working-conduit, and perforated plates or covers for the outer conduit arranged between the walls of the two conduits, substantially as and for the purpose specified.

3. The combination of an outer drainage-conduit with an inner slotted working-conduit having raised slot edges, and perforated plates or covers for the outer conduit arranged between the walls of the two conduits, substantially as and for the purpose specified.

4. The combination of an outer drainage-conduit with an inner slotted working-conduit, and removable perforated plates or covers for the outer conduit arranged between the walls of the two conduits, substantially as and for the purpose specified.

5. The combination of an outer drainage-conduit with an inner slotted working-conduit, and drainage-wells for said outer conduit, substantially as and for the purpose specified.

6. The combination of an outer drainage-conduit with an inner slotted working-conduit, and drainage-wells for said inner conduit, substantially as and for the purpose specified.

7. The combination of an outer drainage-conduit with an inner slotted working-conduit, and drainage-wells for both of said conduits, substantially as and for the purpose specified.

8. The combination of an outer drainage-conduit with an inner slotted working-conduit, drainage-wells for both of said conduits, and removable covers to said drainage-wells, substantially as and for the purpose specified.

9. The combination of a drainage-conduit with a working-conductor conduit having a longitudinal slot in its upper part, and made integral with the drainage-conduit, and in which the two conduits form one structure, and drainage-pipes to drain off the water from the conductor-conduit into the drainage-conduit, substantially as and for the purpose specified.

10. The combination of a drainage-conduit and a working-conductor conduit, the two made integral or arranged side by side, whereby the drainage-conduit carries off the water before it reaches the slot of the working-conduit, substantially as and for the purpose specified.

11. The combination of a slotted working-conductor conduit with an outer case or drainage-conduit, and longitudinal cleaning-passages between the walls of the two conduits, substantially as and for the purpose specified.

12. The combination of a slotted conduit formed of metal with a longitudinal stringer of wood or insulating material secured to its side, a working-conductor secured to the wood, and a filling of insulating material between the upper part of the conductor and upper part of the conduit, substantially as and for the purpose specified.

13. The combination of a slotted conduit formed of metal with a longitudinal stringer of wood or insulating material secured to its side, a working-conductor consisting of two metals united to form a compound conductor secured to the wood, and a filling of insulating material between the upper part of the conductor and upper part of the conduit to cover the joints between the metals forming the conductor and the conductor and wood and wood and conduit-wall, substantially as and for the purpose specified.

14. The combination of a slotted conduit of metal, a longitudinal stringer of wood or insulating material upon its wall, a working-conductor secured to said stringer, and insulating material covering the side of the conduit and stringer, but exposing the face of the conductor, substantially as and for the purpose specified.

15. In a slotted conduit formed in two halves, the combination of one-half thereof, formed of metal, with stringers of wood or insulating material upon its wall, a working-conductor secured to said stringers, and insulating material covering the side of the conduit and stringer but exposing the face of the conductor, substantially as and for the purpose specified.

16. The combination of a metallic slotted conduit having longitudinal recesses in its walls, longitudinal stringers set into said recessed walls, and working-conductors secured upon said stringers, substantially as and for the purpose specified.

In testimony of which invention I hereunto set my hand.

RUDOLPH M. HUNTER.

Witnesses:
E. M. BRECKINREED,
RICHD. S. CHILD, Jr.